(No Model.) 4 Sheets—Sheet 1.
D. J. & J. F. DEVANE.
THRASHING MACHINE.

No. 387,627. Patented Aug. 14, 1888.

WITNESSES
E. A. Newman
C. M. Newman

INVENTOR
Daniel J. Devane,
John F. Devane,
By their Attorneys
Baldwin, Hopkins & Payton.

(No Model.)　　　　　　　　　　　　　　　　4 Sheets—Sheet 2.
D. J. & J. F. DEVANE.
THRASHING MACHINE.

No. 387,627.　　　　　　　　Patented Aug. 14, 1888.

(No Model.) 4 Sheets—Sheet 3.

D. J. & J. F. DEVANE.
THRASHING MACHINE.

No. 387,627. Patented Aug. 14, 1888.

WITNESSES,
E. A. Newman.
C. M. Newman.

INVENTOR,
Daniel J. Devane,
John F. Devane,
By their Attorneys
Baldwin, Hopkins & Payton (No Model.) 4 Sheets—Sheet 4.

D. J. & J. F. DEVANE.
THRASHING MACHINE.

No. 387,627. Patented Aug. 14, 1888.

WITNESSES,
E. A. Newman.
C. M. Newman.

INVENTOR,
Daniel J. Devane,
John F. Devane,
By their Attorneys
Baldwin, Hopkins & Peyton.

United States Patent Office.

DANIEL J. DEVANE AND JOHN F. DEVANE, OF QUITMAN, GEORGIA.

THRASHING-MACHINE.

SPECIFICATION forming part of Letters Patent No. 387,627, dated August 14, 1888.

Application filed April 11, 1887. Serial No. 234,410. (No model.)

*To all whom it may concern:*

Be it known that we, DANIEL J. DEVANE and JOHN F. DEVANE, of Quitman, in the county of Brooks and State of Georgia, have invented certain new and useful Improvements in Thrashing-Machines, of which the following is a specification.

Our invention consists in an improved way of supporting and operating the shaking-table or separator of a thrashing-machine, as will be hereinafter described and claimed.

Figure 1:
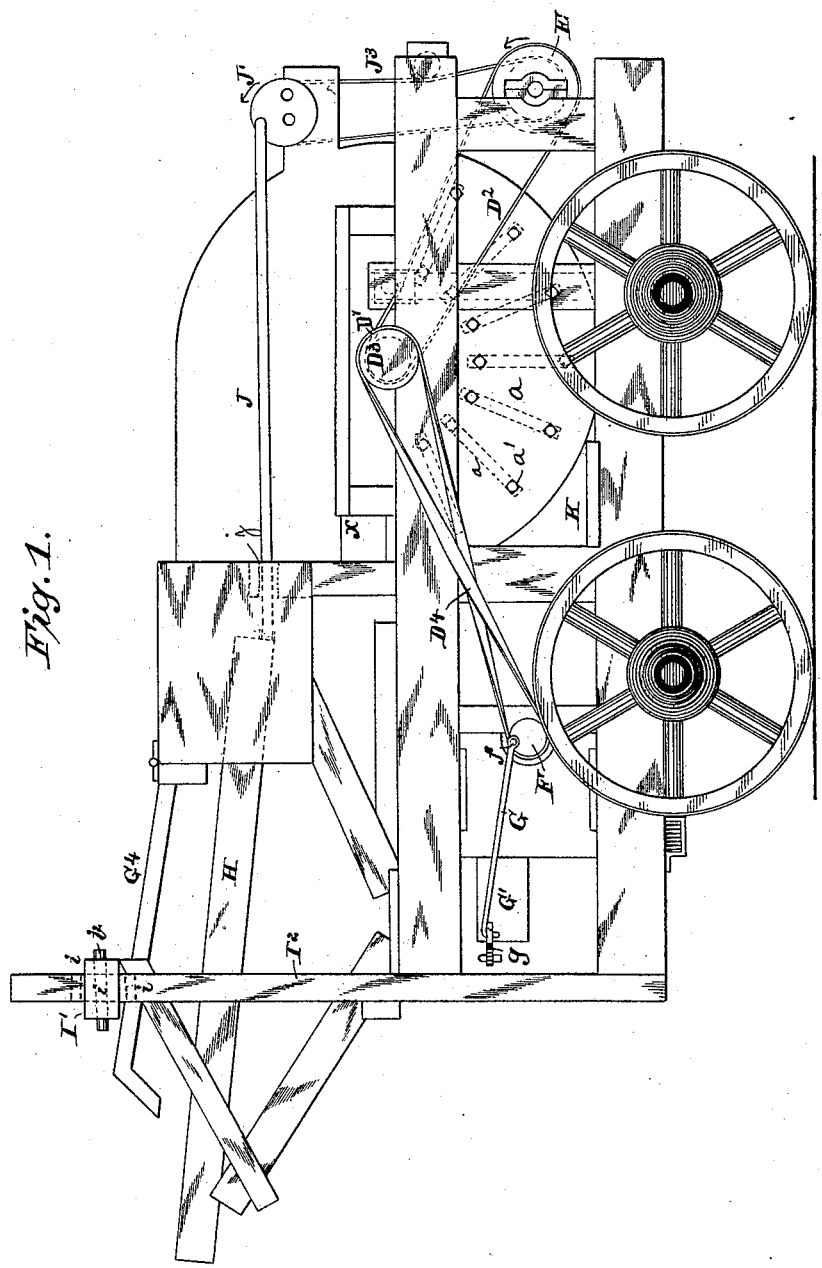
Figure 2:
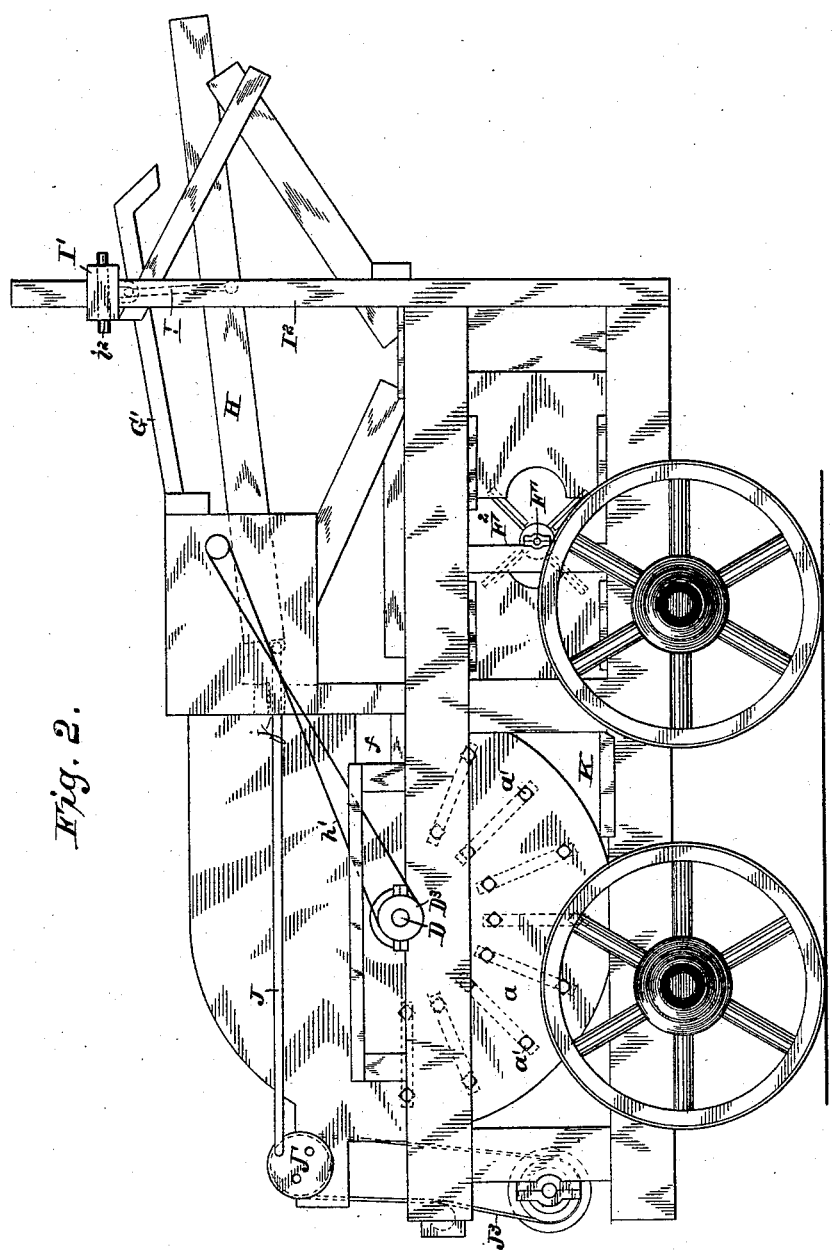
Figure 3:
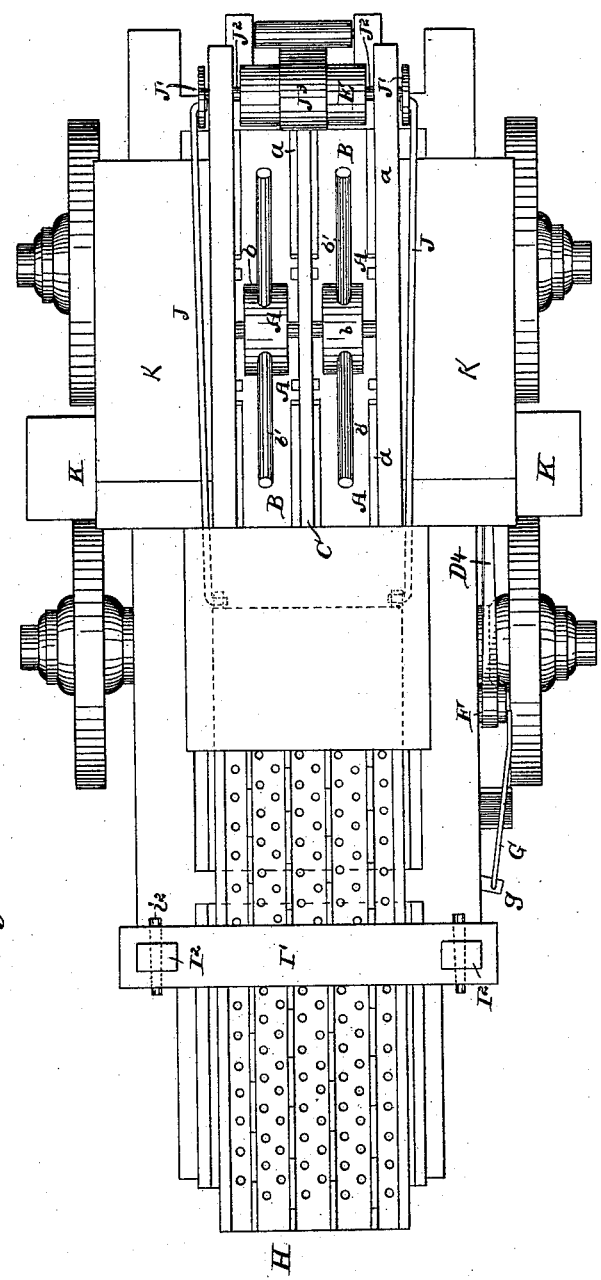
Figure 4:
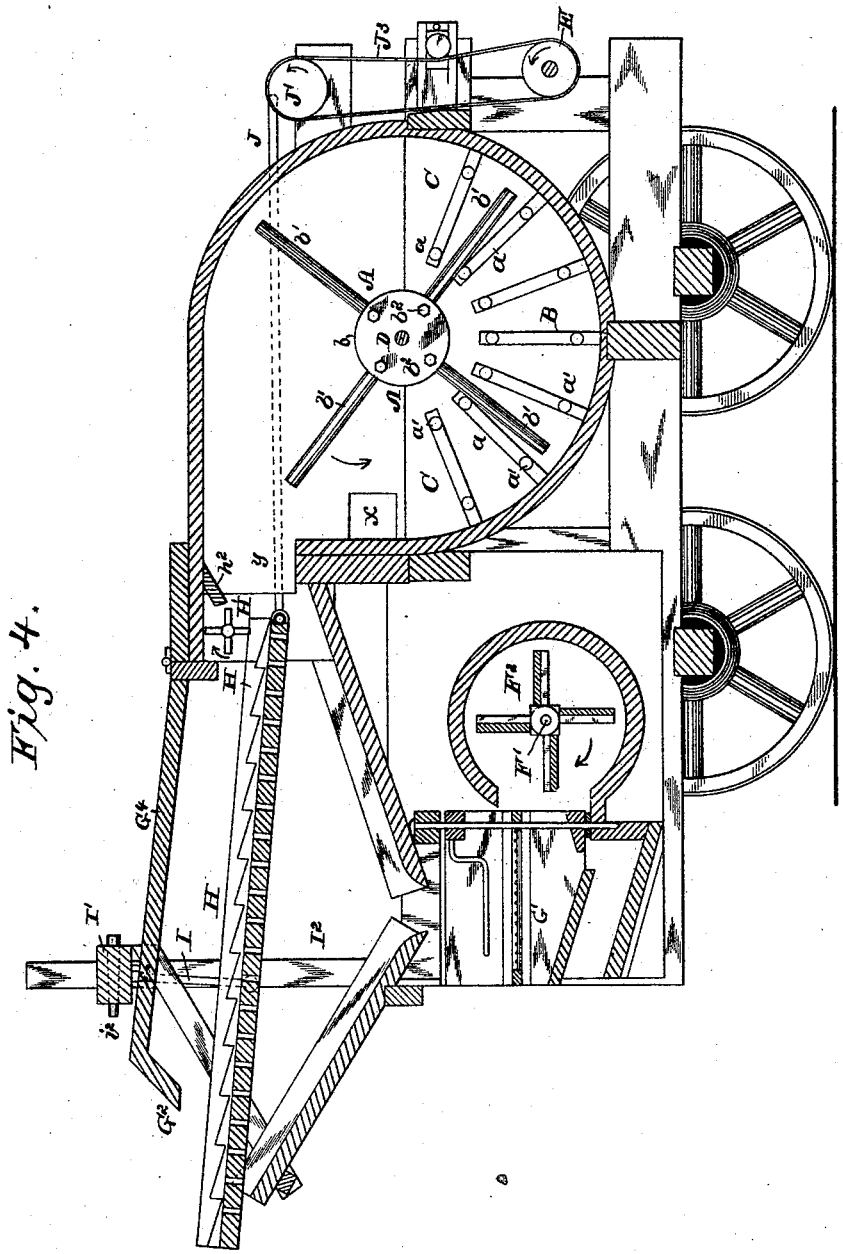

In the accompanying drawings, Figure 1 is a view of one side of the thrasher embodying our improvements; Fig. 2, a view of the opposite side; Fig. 3, a top view, and Fig. 4 a longitudinal central section.

In the drawings we have shown a thrashing-machine of the type to which we preferably apply our improvements.

We will first describe the general organization of the machine to which our improvements are applied.

One or more rotary flails, A, are located within a flail-chamber, B. When two flails are used, a vertical plate, C, is employed to divide equally the lower half of the chamber B. On the opposite side walls of the lower part of the chamber B, and on each side of the dividing-plate C, when it is used, are secured cleats or ribs $a$, which form obstructions to the passage of the grain, and thereby facilitate the thrashing. The cleats are preferably secured to the walls of the chamber by bolts $a'$, that extend through to the outside of the machine, as shown.

The flail A consists of a hub, $b$, to which a series of radial beater-arms, $b'$, are secured by means of bolts $b^2$, extending horizontally through the hub and through the inner ends of the arms. The flail or flails are keyed to a shaft, D, on one end of which is a pulley, D', that is connected by means of a belt, $D^2$, with the main drum E, to which the driving-power is primarily applied. The shaft D also carries a pulley, $D^3$, that connects by means of a crossed belt, $D^4$, with a pulley, F, on the shaft F' of the fan $F^2$. A rod, G, is hinged to a wrist-pin, $f$, placed eccentrically on the pulley F, and is also hinged at its other end to a bell-crank-lever, $g$, that is connected with the winnowing-screen G'.

The shaking-table or separator H is of well-known construction, but is supported and operated in an improved way, as will be hereinafter described and claimed. It is connected at its outer end by means of hangers I to a cross-beam, I', mounted on uprights $I^2$. The hangers I are hinged to the cross beam and to each side of the separator, so as to permit it to swing freely back and forth. The uprights $I^2$, which carry the cross-beam, may be provided with a vertical series of perforations, $i$, and the cross-beam may also be perforated on each end, as shown, so as to be secured to the uprights at any desired elevation by means of pins $i^2$ to give the table the desired tilt or pitch.

Any other means may be employed to give the separator a vertical adjustment at its outer end.

The inner end of the separator is hinged on each side to pitman-rods J, which are connected eccentrically with disks J' on a shaft, $J^2$, mounted in the frame and extending to each side thereof. The shaft $J^2$ is driven from the main drum E by means of a belt, $J^3$. The rods extend through openings $j$ in the uprights, and the weight of the inner end of the separator is borne by the pitman-rods, which rest in said openings. The throw of the rods, and consequently the amplitude of vibration of the separator, may be regulated by adjusting the ends of the pitmen in the perforations in the disks, said perforations being located at different distances from the center of the disks, as shown.

The separator-table is of the usual construction, and beneath it are the chutes for delivering the grain to the winnowing-screen G'.

A housing, $G^4$, extends over the separator from the end of the flail-chamber to a short distance beyond the uprights $I^2$.

At the end of the table next the opening $y$ of the flail-chamber is located a rotary rake, H', driven by a crossed belt, $h'$, Fig. 2, from the flail-shaft. This rake, as is well understood, helps to feed the straw from the flail-chamber to the separating-table. The inclined board $h^2$, which extends across the opening $y$ just in front of the rake, guides the straw into engagement with the rake, so as to give it a better hold.

The fan is operated in the usual way, and the grain after leaving the winnowing-screen is delivered through a spout at the side of the machine.

K K are the platforms on which the attendant stands when feeding the machine.

The grain is fed into the flail-chamber at $x$, and is caught by the beater-arms, turned over and over, and beaten against the sides and periphery of the flail-chamber, and then fed out through the opening $y$ to the separator H.

We are aware that beaters revolving in flail-chambers having radial cleats are old. We are also aware that it is old to provide separators with means for adjusting them at their outer ends, and that vibrating winnowing-screens are common devices. We do not therefore claim such subject-matter, our invention being confined to the improvements in the means for supporting and operating the shaking table or separator, as set forth in the following claim.

We claim as our invention—

The combination of the main frame, the shaft $J^2$, the disks $J'$, mounted on said shaft, the pitmen connected eccentrically with said disks and extending through the openings $j$ of said frame, the separator hinged at its inner end to and supported by said pitmen, and the adjustable links supporting said separator at its outer end, substantially as described.

In testimony whereof we have hereunto subscribed our names.

DANIEL J. DEVANE.
JOHN F. DEVANE.

Witnesses:
MITCHELL BRICE,
J. E. BRICE.